United States Patent [19]
Ruff et al.

[11] Patent Number: 5,182,095
[45] Date of Patent: Jan. 26, 1993

[54] METHOD FOR PROCESSING RESIDUES FROM THE DISTILLATION OF CHLOROSILANES

[75] Inventors: Klaus Ruff, Troisdorf; Bernhard Falk, Rheinfelden-Minseln; Detlef Liesching, Troisdorf-Sieglar, all of Fed. Rep. of Germany

[73] Assignee: Hüls Troisdorf Aktiengesellschaft, Cologne, Fed. Rep. of Germany

[21] Appl. No.: 730,035

[22] Filed: Jul. 12, 1991

Related U.S. Application Data

[63] Continuation of Ser. No. 282,452, Dec. 9, 1988, abandoned.

[30] Foreign Application Priority Data

Dec. 16, 1987 [DE] Fed. Rep. of Germany ....... 3742614

[51] Int. Cl.$^5$ .......................... C01B 33/00; A64D 3/00
[52] U.S. Cl. .................................... 423/659; 423/488; 423/336; 588/226; 588/248
[58] Field of Search ................. 423/77, 149, 336, 488, 423/659; 588/226, 248

[56] References Cited

U.S. PATENT DOCUMENTS

| | | | |
|---|---|---|---|
| 1,865,797 | 7/1932 | Shiffler | 423/488 |
| 2,161,641 | 6/1973 | Weller et al. | 423/488 |
| 3,878,291 | 4/1975 | Keller et al. | 423/488 |
| 3,980,758 | 9/1976 | Krumböck et al. | 423/488 |
| 4,867,960 | 9/1989 | Tom | 423/488 |
| 5,008,098 | 4/1991 | Bernadner et al. | 423/659 |
| 5,066,472 | 11/1991 | Ruff et al. | 423/342 |

FOREIGN PATENT DOCUMENTS

| | | | |
|---|---|---|---|
| 154181 | 7/1952 | Australia | 423/488 |
| 215864 | 9/1956 | Australia | 423/488 |

*Primary Examiner*—Gary P. Straub
*Assistant Examiner*—Timothy C. Vanoy
*Attorney, Agent, or Firm*—Felfe & Lynch

[57] ABSTRACT

A residue from the production of chlorosilanes from raw silicon is treated with steam and aditionally with nitrogen-oxygen mixtures. The resulting residue has a lower chloride content.

5 Claims, No Drawings

METHOD FOR PROCESSING RESIDUES FROM THE DISTILLATION OF CHLOROSILANES

This application is a continuation of application Ser. No. 07/282,452, filed Dec. 9, 1988, now abandoned.

BACKGROUND OF THE INVENTION

Chlorosilanes such as tetrachlorosilane and trichlorosilane are produced by the reaction of raw silicon or ferrosilicon with hydrogen chloride or chlorine. After the chlorosilanes have been removed from the raw reaction product by distillation for example, there remains a residue of liquid and solid substances. This residue contains entrained metal chlorides or metal chlorides which pass over in vapor form, and which form in the reaction from the other metals contained in the raw silicon. Another portion of the residue consists of high-boiling compounds, such as titanium tetrachloride, hexachlorodisiloxane or pentachlorodisiloxane. The chief components of the residue in addition to chlorine, according to elemental analysis, are substantially silicon and aluminum. After the chlorosilanes are removed by distillation, the residue must be processed is in the form of a suspension or of a solid depending on the distillation conditions.

It is known to react the residue with steam to form hydrogen chloride (cf. DE-OS 21 61 641). A disadvantage of this method is that by the addition of a small amount of water vapor, a highly concentrated hydrogen chloride is obtained, but the remainder of the residue still contains a considerable amount of chloride which requires additional processing. By using large amounts of steam the residual chloride content can be further reduced, but the issuing hydrogen chloride contains unreacted water vapor, from which dilute hydrochloric acid forms in condensation, which is not recyclable and must be disposed of.

To avoid the formation of dilute hydrochloric acid it has been proposed to perform the hydrolysis of the residue with mixtures of water vapor and hydrogen chloride and to recirculate the unreacted water. In this process too, the residue is brought into contact with large amounts of steam in order to achieve low residual chloride contents. The energy consumption of this process is large.

The problem thus was to perform the processing of the distillation residue such that in the hydrolysis the hydrogen chloride would be produced in very concentrated form needing little energy consumption, and an inert, dumpable residue having a low chlorine content would remain.

SUMMARY OF THE INVENTION

The present invention is a method of processing residues which are produced as bottom products after the distillation of chlorosilanes from the hydrochlorination or chlorination of silicon, with the release of hydrogen chloride by hydrolysis with steam, with or without the addition of more hydrogen chloride in the hydrolysis, wherein the residues are brought in contact with mixtures of nitrogen and oxygen, preferably with air, at temperatures of 60° to 1400° C.

The other aspects of the invention include performing a partial hydrolysis with steam before the residue is contacted with air during the treatment of the residue. The air and steam may simultaneously contact the residue.

Surprisingly, it has been found that steam hydrolysis of the distillation residue is greatly facilitated if the residue is contacted with nitrogen-oxygen mixtures, preferably with air, at temperatures between 60° and 1400°, preferably between 180° and 350° C. A mixture with a lower or higher oxygen content than air can be used. The air or mixture can be present throughout the entire hydrolysis process, or it can be fed periodically to the residue together with the steam. Preferably the input of steam and the input of the mixture or air alternate with one another, preferably first the steam and then the mixture or air being put in, and then another treatment with steam being performed. Hydrogen chloride can be added to the steam without thereby diminishing the effect that has been found.

The distillation residue used has a content of 55 to 80 wt. -% of chlorine, mostly in the form of chloride.

In accordance with the invention a hydrolysis residue is obtained with a low residual chloride content between 2 and 6 wt. -%, which can be discarded in most industrial dumps. The residue from the known method, which is treated with steam only, has a high chloride content of 11 to 14 wt. -%, still contains insoluble chlorides, and must be discarded in a special dump.

In accordance with the invention a greater percentage of the chlorine is removed from the distillation residue and obtained as reusable hydrogen chloride, which can be recycled to the hydrochlorination of the raw silicon. The residual chloride content of the hydrolyzed residue is decidedly lower. The amount of steam is substantially reduced in accordance with the invention, resulting in a considerable energy savings.

In a special embodiment of the invention, the steam is produced in a flame from a hydrogen donor and air. The hydrogen donor is, for example, hydrogen, preferably a hydrogen containing residual gas or in some cases natural gas, a fuel gas containing hydrocarbons, or a liquid fuel such as fuel oil or the like.

The combustion and the hydrolysis can be performed simultaneously, in which case, additionally, the combustion flame allowes a higher reaction temperature.

COMPARATIVE EXAMPLE

The distillation of a mixture of trichlorosilane and a tetrachlorosilane which had been obtained by the hydrochlorination of raw silicon in a fixed-bed reactor, produced a distillation residue having a chlorine content of 70% by weight.

250 g of this residue was placed in a heated stainless steel mixer equipped with stirrers, and treated at 230° C. with a steam flow of 250 g/h. The hydrolysis residue had an elutable residual chloride content of 17.9 wt. -% after 30 minutes, 15.1 wt. -% after 60 minutes, 13.9 wt. -% after 90 minutes, 13 wt. -% after 120 minutes, 12.0 wt. -% after 180 minutes and 11.8 wt. -% after 240 minutes.

EXAMPLE 1

The same residue in the same mixer as above was then reacted by the method of the invention. The mixer containing 250 g of residue was fed at 230° C. with a steam flow of 250 g/h. After 60 minutes the hydrolysis was interrupted and air at 230° C. was fed into the mixture at a rate of 0.1 Nm³/h for 20 minutes. The air feed was shut off and again steam of 230° C. was introduced at a rate of 50 g/h. The elutable residual chloride content of the hydrolysis residue amounted to 7.8 wt. -% after another 60 minutes, 6.0 wt. -% after 120 minutes, and 5.0 wt. -% after 180 minutes.

400 g of steam was needed in order to lower the elutable chlorides in the hydrolysis residue to 5 wt. -%. In the example given for comparison, a residual chloride content of 11.8 wt. -% was achieved using 1000 g of steam.

EXAMPLE 2

As in Example 1, 250 g of residue with 76 wt. -% chlorine content was treated with 270 g/h of steam at 250° C. for 50 minutes, and then treated at 190° C. with 0.15 Nm$^3$/h of air for 5 minutes. After another 120 minutes of treatment at 250° C. with 70 g/h of steam a chloride content of 4.8 wt. -% was achieved.

EXAMPLE 3

250 g of residue with a chlorine content of 68 wt. -% was treated simultaneously with 0.1 Nm$^3$/h of air and 130 g/h of steam at 220° C. After 160 minutes the elutable chloride content had decreased to 5.5 wt. -%

It will be understood that the specification and examples are illustrative but not limitative of the present invention and that other embodiments within the spirit and scope of the invention will suggest themselves to those skilled in the art.

We claim:

1. A method of processing a residue which is produced as bottom product after the distillation of chlorosilane from the hydrochlorination or chlorination of silicon, consisting essentially of: subjecting the residue to a hydrolysis with steam and releasing hydrogen chloride from the residue; and then contacting the residue with a mixture of nitrogen and oxygen at a temperature of 60° to 1400° C.

2. The method of claim 1 wherein the mixture of nitrogen and oxygen is air.

3. The method of claim 1 wherein the steam is produced in a flame from hydrogen and air.

4. The method of claim 1 wherein the temperature is 180° to 350° C.

5. The method of claim 2 wherein the temperature is 180° to 350° C.

* * * * *